US011750861B2

(12) United States Patent
Doidge

(10) Patent No.: US 11,750,861 B2
(45) Date of Patent: Sep. 5, 2023

(54) COMPENSATING FOR INTERRUPTIONS IN A WIRELESS CONNECTION

(71) Applicant: DISPLAYLINK (UK) LIMITED, Cambridge (GB)

(72) Inventor: Ian Christopher Doidge, Cambridge (GB)

(73) Assignee: DISPLAYLINK (UK) LIMITED

( * ) Notice: Subject to any disclaimer, the term of this patent is extended or adjusted under 35 U.S.C. 154(b) by 133 days.

(21) Appl. No.: 16/754,669

(22) PCT Filed: Oct. 4, 2018

(86) PCT No.: PCT/GB2018/052833
§ 371 (c)(1),
(2) Date: Apr. 8, 2020

(87) PCT Pub. No.: WO2019/073205
PCT Pub. Date: Apr. 18, 2019

(65) Prior Publication Data
US 2020/0359070 A1 Nov. 12, 2020

(30) Foreign Application Priority Data
Oct. 9, 2017 (GB) .................................. 1716519

(51) Int. Cl.
*H04N 21/24* (2011.01)
*H04N 19/156* (2014.01)
(Continued)

(52) U.S. Cl.
CPC ....... *H04N 21/2402* (2013.01); *H04L 1/0002* (2013.01); *H04L 47/38* (2013.01);
(Continued)

(58) Field of Classification Search
CPC ...... H04N 60/11; H04N 19/156; H04N 19/89; H04N 21/23439; H04N 21/2402;
(Continued)

(56) References Cited

U.S. PATENT DOCUMENTS 6,292,834 B1 * 9/2001 Ravi ................. H04L 29/06027
375/E7.004
6,697,642 B1 2/2004 Thomas
(Continued)

FOREIGN PATENT DOCUMENTS

WO 2007051156 A2 5/2007
WO 2010052570 A1 5/2010

OTHER PUBLICATIONS

Sethares, William A., and Thomas W. Staley. "Periodicity transforms." IEEE Transactions on Signal Processing 47.11 (1999): 2953-2964, 12 pages. (Year: 1999).*

(Continued)

Primary Examiner — George C Neurauter, Jr.
(74) Attorney, Agent, or Firm — Paradice & Li LLP

(57) ABSTRACT

A method of compensating for potential interruptions in a wireless connection (110) over which data is transmitted from a host device (11) to a client device (12) involves determining an expectation of an interruption to the wireless connection (110), setting a second compression level for compressing the data when an interruption is due, the second compression level being set at a higher level than a first compression level normally used for the data, compressing the data at the second compression level, and forwarding the data compressed at the second compression level to a transmitting component (16) for transmittal to the client device (12). The expectation of a potential interruption may be determined by analysing a historical record of previous interruptions to determine a periodicity of the previous interruptions and using the determined periodicity to calcu-
(Continued)

late when a next potential interruption may be expected, or by determining that a buffer used for storing the data prior to transmittal is full, indicative that an interruption has commenced, or by receipt of information from the transmitting component that a potential interruption is expected to occur or has commenced.

19 Claims, 8 Drawing Sheets

(51) Int. Cl.
    *H04L 1/00*     (2006.01)
    *H04L 69/04*     (2022.01)
    *H04N 21/2343*     (2011.01)
    *H04L 47/38*     (2022.01)
    *H04H 60/11*     (2008.01)

(52) U.S. Cl.
    CPC ........... *H04L 69/04* (2013.01); *H04N 19/156* (2014.11); *H04N 21/23439* (2013.01); *H04H 60/11* (2013.01)

(58) Field of Classification Search
    CPC . H04L 1/0002; H04L 29/06489; H04L 47/38; H04L 69/04
    See application file for complete search history.

(56) References Cited

U.S. PATENT DOCUMENTS

| | | | | |
|---|---|---|---|---|
| 6,968,387 | B2 * | 11/2005 | Lanphear | H04N 21/23406 375/E7.014 |
| 7,002,973 | B2 | 2/2006 | MeLampy et al. | |
| 7,423,990 | B2 * | 9/2008 | Kelton | H04N 7/17318 348/E7.071 |
| 9,203,886 | B2 * | 12/2015 | Balachandran | H04L 65/60 |
| 9,854,533 | B2 * | 12/2017 | Cho | H04L 1/1874 |
| 10,693,575 | B2 * | 6/2020 | Jana | H04B 17/382 |
| 11,243,290 | B2 * | 2/2022 | Mohammadi | H04W 64/006 |
| 11,375,048 | B2 | 6/2022 | Doidge | |
| 2003/0198184 | A1 * | 10/2003 | Huang | H04L 29/06 370/231 |
| 2005/0149835 | A1 | 7/2005 | Dacosta | |
| 2005/0210515 | A1 | 9/2005 | Roh et al. | |
| 2007/0097257 | A1 | 5/2007 | El-Maleh et al. | |
| 2008/0170630 | A1 | 7/2008 | Falik et al. | |
| 2008/0191816 | A1 * | 8/2008 | Balachandran | H04L 47/11 333/24 R |
| 2009/0254657 | A1 * | 10/2009 | Melnyk | H04N 21/6583 709/224 |
| 2009/0276541 | A1 | 11/2009 | Lock et al. | |
| 2010/0121977 | A1 * | 5/2010 | Kontola | H04W 4/02 709/232 |
| 2011/0310866 | A1 * | 12/2011 | Kennedy | H04W 16/14 370/328 |
| 2012/0195356 | A1 * | 8/2012 | Yi | H04N 19/119 375/224 |
| 2012/0271920 | A1 * | 10/2012 | Isaksson | H04N 21/2662 709/219 |
| 2013/0301430 | A1 | 11/2013 | Pamu et al. | |
| 2014/0204902 | A1 * | 7/2014 | Maltsev | H04W 36/0083 370/331 |
| 2015/0003265 | A1 * | 1/2015 | Mansour | H04W 4/029 370/252 |
| 2015/0071075 | A1 * | 3/2015 | Ramakrishnan | H04N 21/2401 370/236 |
| 2016/0198068 | A1 | 7/2016 | Makar et al. | |
| 2016/0329636 | A1 * | 11/2016 | Larsson | G01S 5/0284 |
| 2017/0142555 | A1 * | 5/2017 | Ljung | H04W 4/027 |
| 2017/0280460 | A1 | 9/2017 | Emmanuel et al. | |
| 2018/0091765 | A1 | 3/2018 | Mobasher et al. | |
| 2019/0199419 | A1 * | 6/2019 | Teslenko | H04B 7/0617 |
| 2019/0354849 | A1 * | 11/2019 | Tran | G06V 10/82 |

OTHER PUBLICATIONS

UK Intellectual Property Office Search Report issued in UK Application No. GB1716519.2 dated Mar. 26, 2018.
International Search Report issued in International Application No. PCT/GB2018/052833 dated Dec. 5, 2018.
International Search Report for PCT/GB2018/052960, dated Jan. 17, 2019, (3 pages).
Search Report for International Application No. GB1717745.2, dated Mar. 23, 2018 (1 page).

* cited by examiner

COMPENSATING FOR INTERRUPTIONS IN A WIRELESS CONNECTION

CROSS-REFERENCE TO RELATED APPLICATIONS

This application is a U.S. national stage application under 35 U.S.C. § 371 of International Patent Application No. PCT/GB2018/052833, filed on Oct. 4, 2018, which claims the benefit of Great Britain Patent Application No. 1716519.2, filed on Oct. 9, 2017, the contents of each of which are incorporated herein by reference in their entirety.

BACKGROUND

As computing and output devices such as displays and speakers become more portable and widely used, it is becoming desirable for them to be wirelessly connected to one another. This introduces new problems, since wireless signals require maintenance that is not required by a wired connection, especially to account for movement of either a host computing device (i.e. the generating and transmitting device) or client device (i.e. the receiving and outputting device). An example of such maintenance is beamforming, by which the host device adjusts a directional wireless signal in order to account for relative movement of the client device. This results in interruption of data transmission over the wireless connection while such adjustment is in progress.

Such interruptions are especially problematic when a stream of data is being transmitted and interruptions will be noticeable to a user, for example in the cases of video or audio data. In these cases an interruption may result in loss of data which will appear to the user as a 'skip' or 'judder'.

The methods of the invention seek to mitigate this problem.

SUMMARY

According to a first aspect, the invention provides a method of compensating for potential interruptions in a wireless connection over which data is transmitted from a host device to a client device, the method comprising:

determining an expectation of an interruption to a wireless connection over which data is being transmitted to a client device;

setting a second compression level for compressing the data when an interruption is due, the second compression level being set at a higher level than a first compression level normally used for the data;

compressing the data at the second compression level;

forwarding the data compressed at the second compression level to a transmitting component for transmittal to the client device.

In one embodiment, the expectation of a potential interruption includes an expectation of a duration of the potential interruption and the data is compressed at the second compression level at least until an expected end of the potential interruption.

The expectation of a potential interruption may be determined by analysing a historical record of previous interruptions to determine a periodicity of the previous interruptions and using the determined periodicity to calculate when a next potential interruption may be expected. Preferably, the duration of the potential interruption is calculated based on the determined periodicity.

According to an embodiment, the expectation of a potential interruption may be determined by determining that a buffer used for storing the data prior to transmittal is full, indicative that an interruption has commenced. Preferably, an end of the duration of the interruption occurs when it is determined that the buffer is able to accept data at a rate higher than a predetermined threshold rate.

In an embodiment, the expectation of a potential interruption is determined by receipt of information from the transmitting component that a potential interruption is expected to occur. Preferably, the duration of the potential interruption is determined by receipt of information from the transmitting component of an expected duration of the potential interruption.

In another embodiment, the expectation of a potential interruption is preferably determined by receipt of information from the transmitting component that an interruption has commenced. Preferably, the duration of the interruption is determined by receipt of information from the transmitting component that the interruption has ended.

The data preferably comprises display data, which is preferably compressed at the second compression level at least until an end of a frame of the display data that is being compressed at the second compression level.

According to some embodiments, the method further comprises:

performing one or more maintenance operations that may cause the potential interruption; and setting the first compression level for compressing the data when the maintenance operation is completed.

The one or more maintenance operations preferably comprises any one or more of:

beamforming;

transmission/reception channel changing;

entering a power-reduced mode of operation;

entering a sleep mode of operation.

According to a second aspect, the invention provides a computer device configured to perform all steps of the method described above.

According to a third aspect, the invention provides a computer readable medium including executable instructions which, when executed in a processing system, cause the processing system to perform all steps of the method described above.

In one embodiment, there is provided a method of compressing streamed data for transmission, comprising 1. Generating a unit of streamed data on a host device
2. The host device determining whether an interruption is likely
3. If not, the host device compressing the data with a normal level of compression
4. If so, the host device compressing the data with a higher level of compression
5. The host device transmitting the streamed data to the output device The normal level of compression may be no compression. Preferably, the higher level of compression is determined from the time available before the interruption will occur, such that the data will be compressed to a sufficiently small volume that it can be transmitted before the interruption occurs.

This method improves the chance that the data will be transmitted despite the interruption, rather than being lost as occurs in conventional systems. The application of a higher level of compression may mean that quality is reduced, but a brief period of low quality will be less disruptive to a user than a break in the stream and outright loss of data.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
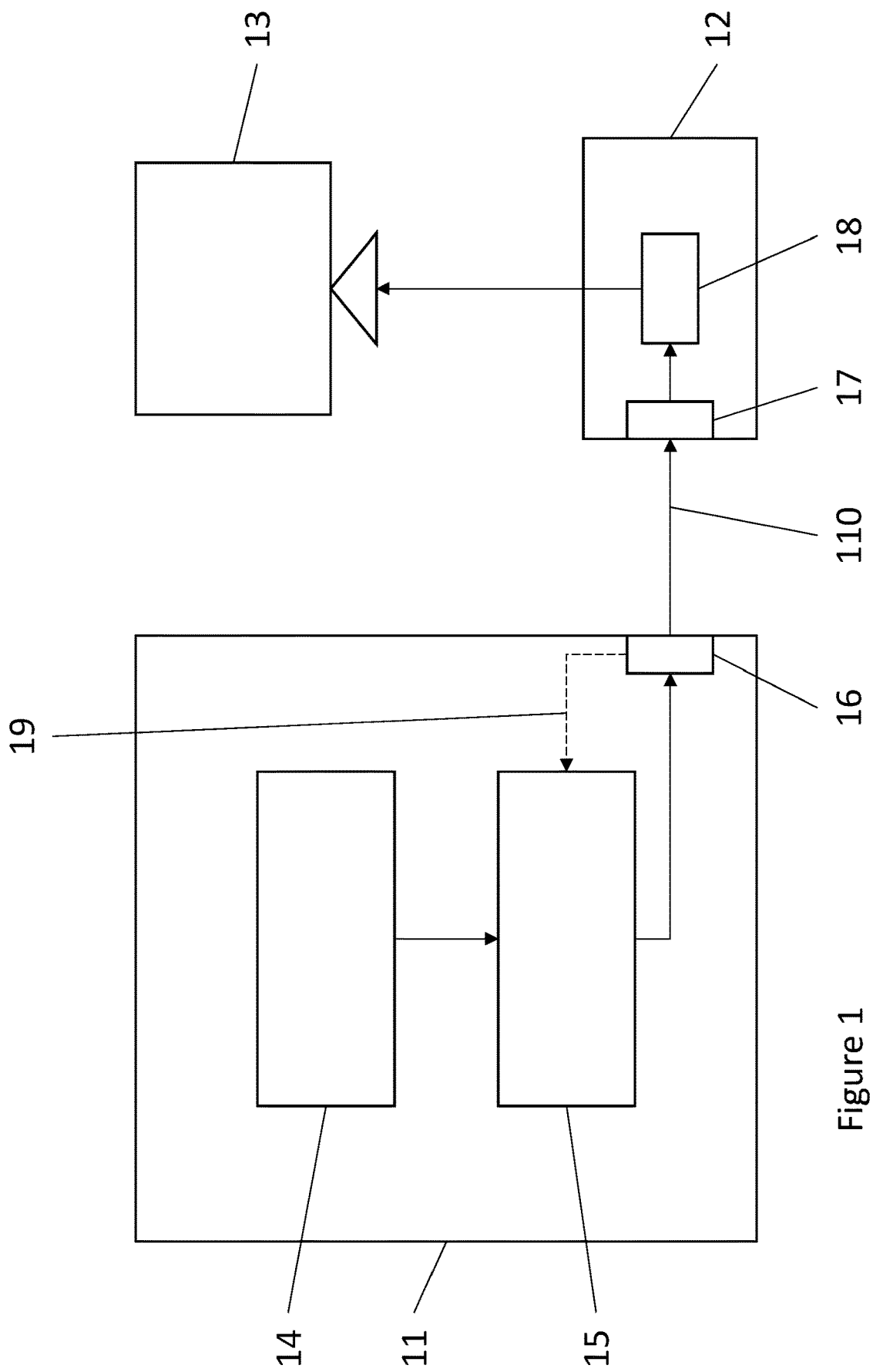
FIG. 1 shows a block diagram of an example system that can be used in an embodiment of the invention.

FIG. 1 shows an example display system comprising a host computing device [11], a display control device [12], and a display device [13]. The host device [11] includes, among other components, an application [14], for example running on a graphics processing unit, which generates display data and a compression engine [15] which applies compression algorithms to reduce the volume of data prior to transmission. The application [14] is connected to the compression engine [15] in order to pass generated display data to it.

The compression engine [15] is in turn connected to a wireless transmitter [16] of the host device [11]. This maintains a wireless connection [110] to a corresponding wireless receiver [17] on the display control device [12] and uses the connection [110] to transmit the compressed display data to the display control device [12].

The display control device [12] may be a docking station, set-top box or similar separate display controller, or alternatively it may be co-located with the display device [13]—i.e. sharing the same casing—for example as part of a head-mounted display such as a virtual-reality headset. It includes the aforementioned wireless receiver [17], connected to a decompression engine [18] which applies algorithms to the received compressed display data in order to re-create at least an approximation of the original data and transmits the decompressed display data to the display device [13] for display.

There may also be other components included in the display control device [12], such as memory and engines for converting the display data from a general-purpose format to a display-specific format, but these are known and are not shown here.

In a conventional system, the compression engine [15] and the wireless transmitter [16] in the host device [11] may only be connected by a single connection which carries data. However, in embodiments of the invention a second connection [19] may also be used to carry signals from the wireless transmitter [17] to the compression engine [15] indicating, for example, the level of bandwidth immediately available in the connection [110] or that an interruption is to take place. This connection [19] is shown in FIG. 1 by a dashed line from the wireless transmitter [16] to the compression engine [15]. The wireless connection may be radio.

Figure 2:
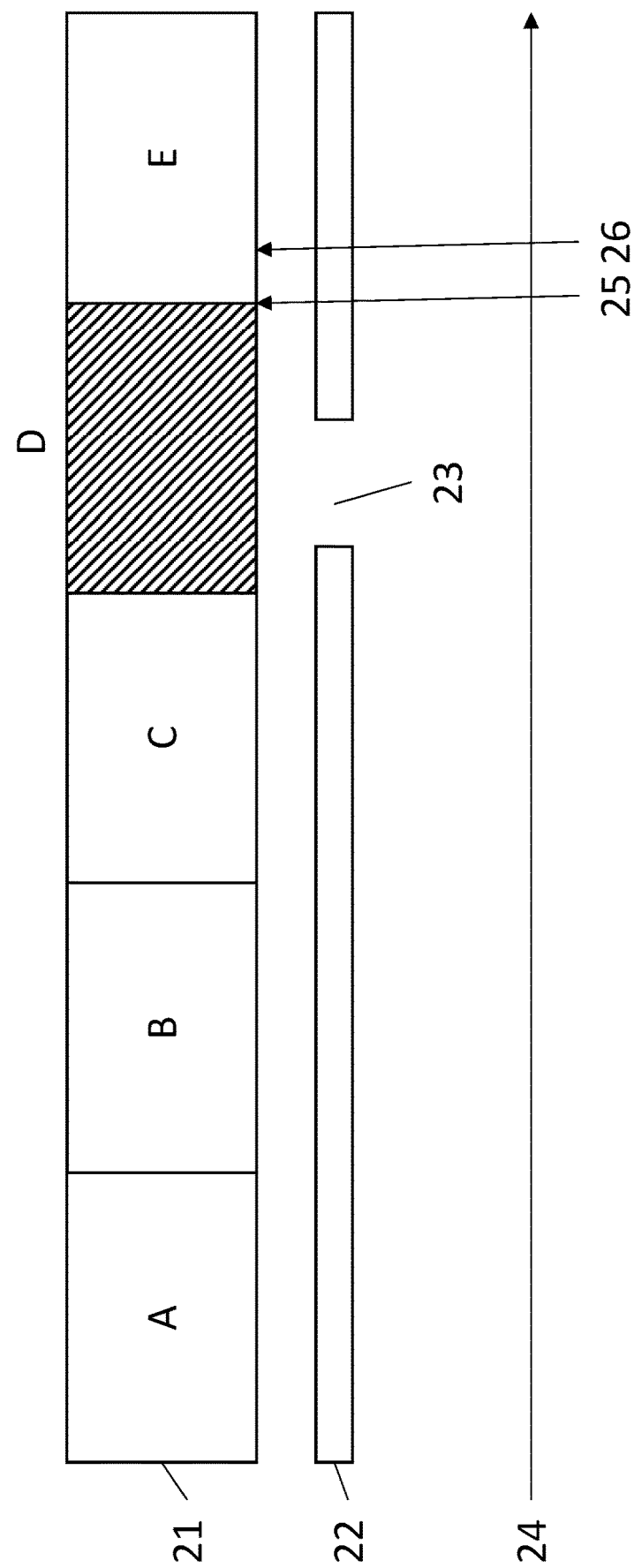
FIG. 2 shows a stream of display data being interrupted in a conventional system.

FIG. 2 shows a stream of data sent in a conventional system. In the upper part of the Figure, frames [21] of display data are represented by individual boxes [21A, B, C, D, E]. The length of each box [21A, B, C, D, E] from left to right indicates the length of time taken for its transmission, and the height of each box [21A, B, C, D, E] indicates the level of compression used compared to the level of compression used in transmission of the other frames [21A, B, C, D, E], such that a smaller height indicates greater compression. In the lower part of the Figure, the signal carried on the wireless connection [110] is represented by an interrupted strip [22]. The interruption [23] represents an interruption in the wireless connection [110] and/or signal [22], for example due to the wireless transmitter [16] and the wireless receiver [17] having moved relative to each other and a beamforming operation being required to accurately align them again. Finally, an arrow [24] from the left side of the Figure to the right side represents the passage of time.

The white frames [21A, B, C, E] represent frames of display data that are transmitted normally as the wireless connection [110] is not interrupted during transmission. They can then be displayed normally on the display device [13] and will present a smooth image. However, the interruption [23] occurs during the transmission of one frame [21D]—indicated with diagonal hatching—and this frame [21D] may therefore be lost during transmission if the interruption is total. Conventionally, under these circumstances, the previous frame [21C] will be repeatedly shown on the display until a new frame arrives, and this will result in the image 'sticking', disrupting the smooth image. If, as may sometimes be the case, the host device [11] is still able to transmit some data over the wireless connection [110], the frame [21D] may still be transmitted but it will be delayed and transmission will not be complete until the time indicated by arrow [26], for example. However, if it is required for display at the time indicated by arrow [25], it will therefore be only partially displayed, leading to the presence of visual artefacts such as tearing in the displayed image. Both cases will be especially noticeable in applications such as virtual reality, in which a detailed moving image is presented and the movement must be both prompt and accurate to avoid causing discomfort to the user.

Interruptions [23] caused by operations of the wireless transmitter [16] and wireless receiver [17], such as beamforming, can be predictable and their timing and length can be extracted from a driver or a wireless controller, if such a secondary connection [19] exists.

Alternatively or additionally, the timings of interruptions may be determined from the history of the wireless connection and transmission characteristics of the link [110]. There are a number of techniques for spectral analysis that are good candidates for identifying such patterns, including those of differing periodicity that may result from multiple overlapping interruptions, and for filtering out noise in the bandwidth caused by, for example, movement of the display control device [12] or host device [11]. Techniques such as fourier or periodicity transforms are two such techniques.

Figure 3:
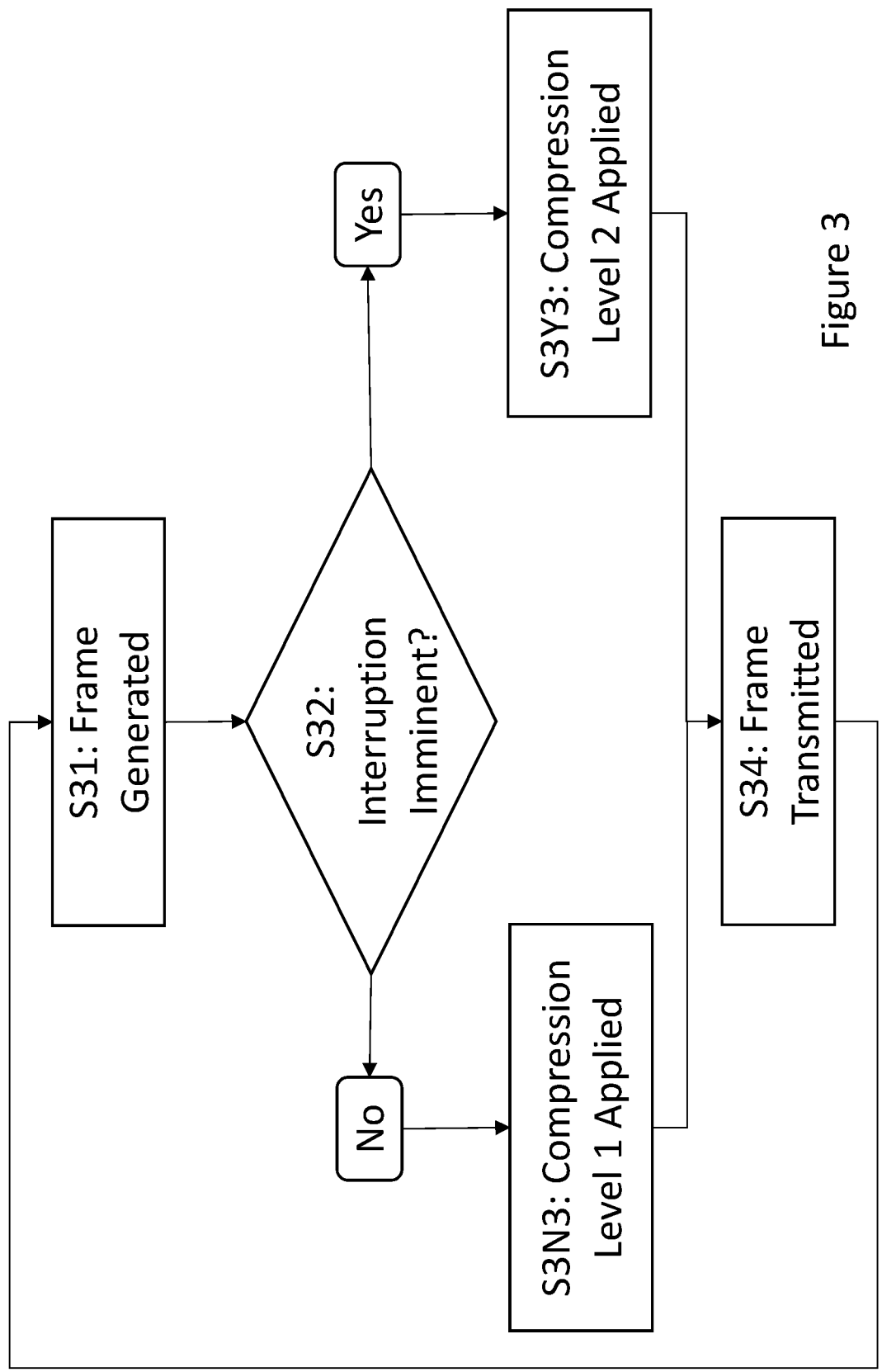
FIG. 3 shows a flow chart of a method according to an embodiment of the invention.
Figure 4A:
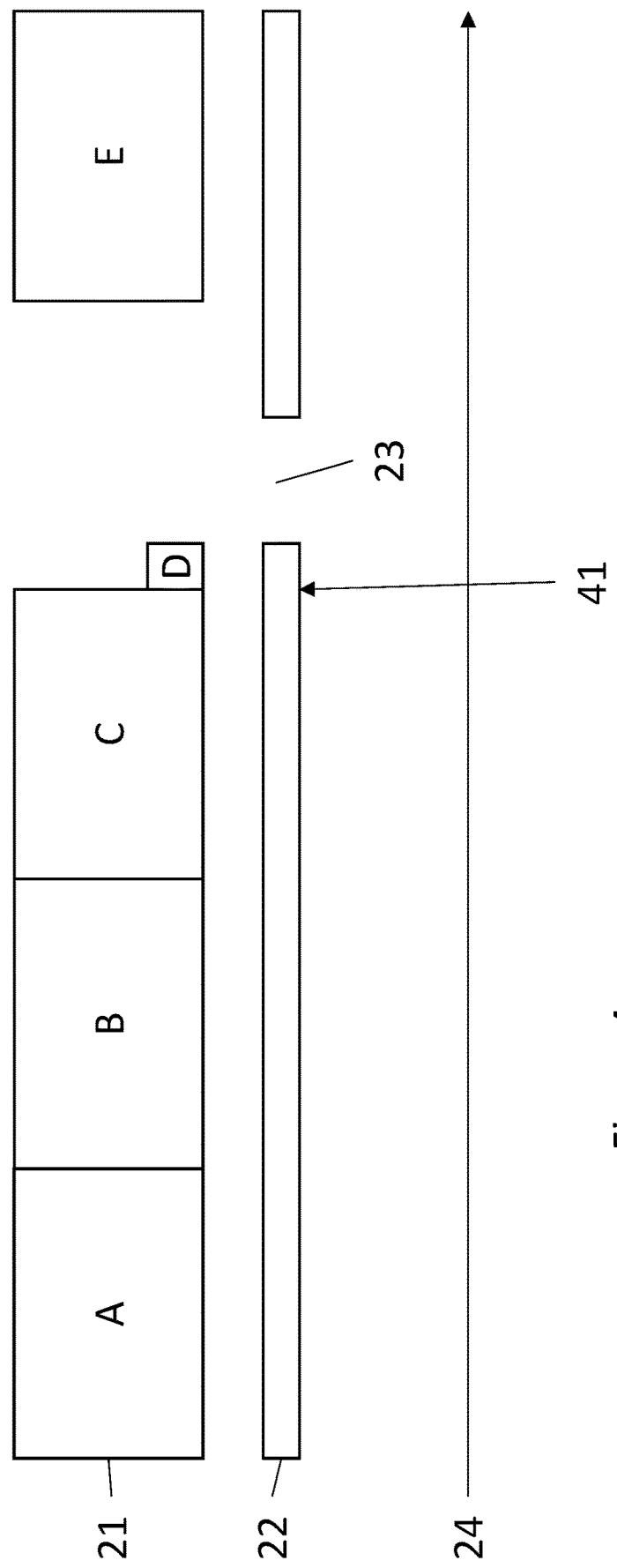
FIGS. 4a and 4b show a stream of display data being interrupted in a system according to an embodiment of the invention with a signal from a wireless transmitter.
Figure 4B:
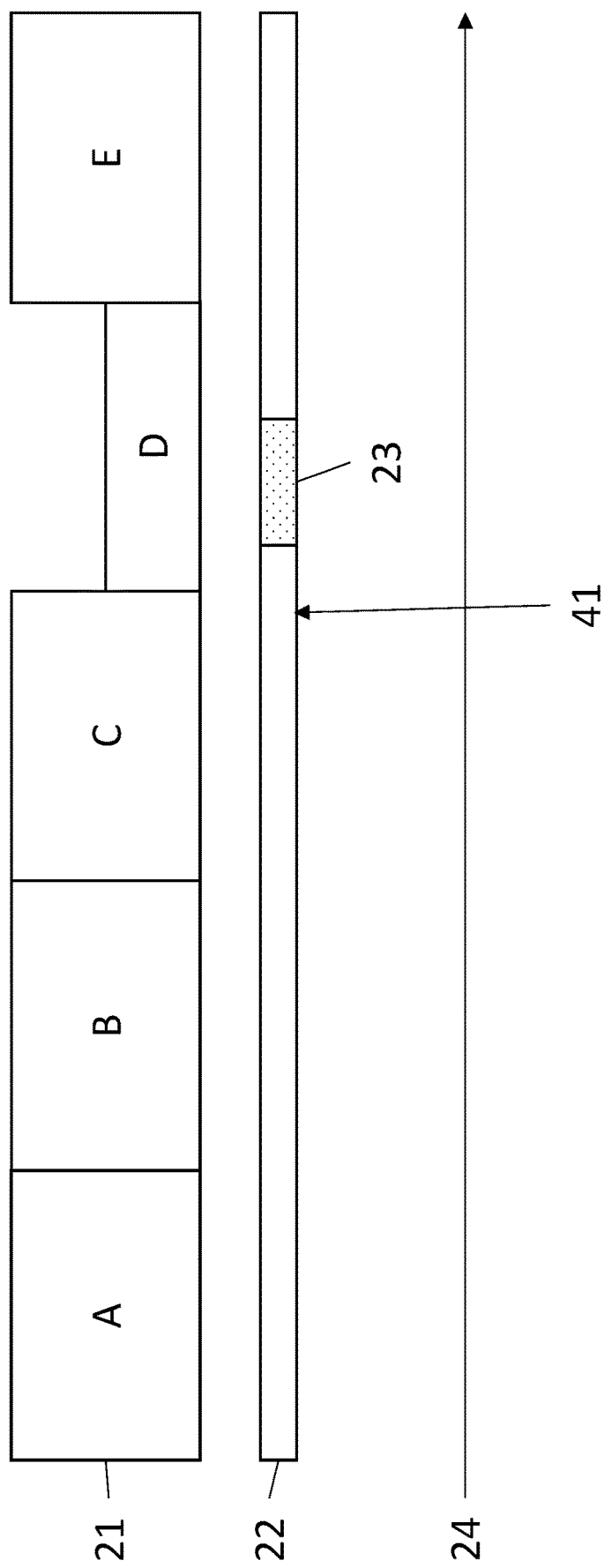
Figure 5:
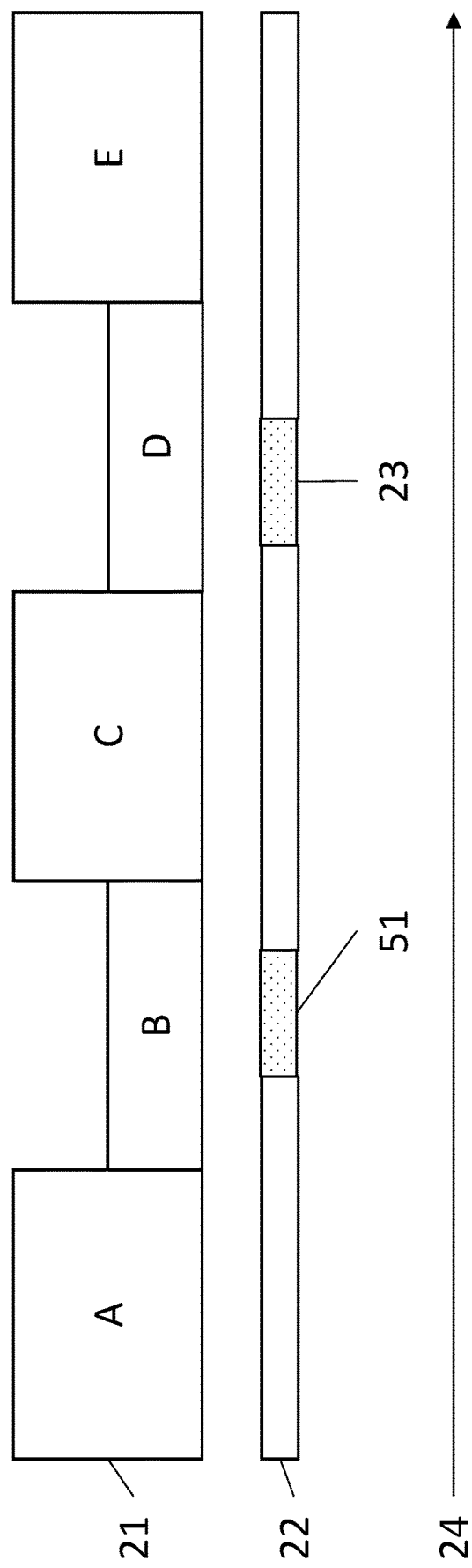
FIG. 5 shows a stream of display data being interrupted periodically in a system according to another embodiment of the invention.

FIG. 3 shows a generic process by which such information can be used, which will be iterated for each of the examples shown in FIGS. 4-6. Throughout FIGS. 4-6, a similar notation is used to that described with reference to FIG. 2: the wireless connection [110] is represented by a narrow strip [22] in the lower part of the Figure, interrupted [23] as previously described. The frames [21] produced and transmitted by the host device [11] are also shown as white boxes as in FIG. 2 sized according to the compression level used in their transmission and the length of time required to transmit them as previously described. The passage of time [24] is indicated by an arrow passing from left to right at the bottom of each Figure.

In this embodiments, at Step S31, the application [14] running on the GPU of the host device [11] generates a frame of display data [21] in the conventional way. It then transmits it to the compression engine [15]. Meanwhile, the wireless transmitter [16] determines whether it would be appropriate to interrupt the connection [110]. For example, it might determine that the signal strength has dropped due to movement of the display control device [12] relative to the host device [11]. Alternatively, it might determine that the temperature of the transmitter [16] has risen and it is necessary to briefly turn off the transmitter [16] for cooling, or it might receive a signal from the wireless receiver [17] on the display control device [12] requesting an interruption in the connection [110], perhaps for similar reasons.

At Step S32 the compression engine [15] determines whether an interruption is due. Examples of methods by which it makes this determination and of its resulting behaviour at Steps S3N3 and S3Y3 are described with reference to FIGS. 4-6.

FIGS. 4a and 4b show the results of an example system in which the wireless transmitter [16] sends a signal [19] to the compression engine [15] indicating that it will soon interrupt the connection [110]. The wireless transmitter [16] may send a periodic signal [19] to the compression engine [15] regardless of the determination of whether it will interrupt the connection [110] but indicating whether it will or won't interrupt the connection. Alternatively, it may only send a signal [19] when it has determined that an interruption [23] is required. Upon receipt of a signal [19] indicating that the connection [110] is to be interrupted, a flag may be set in the compression engine [15] to indicate whether an interruption [23] is required and due, or the signal [19] may simply serve to instruct the compression engine [15] to apply higher compression to the next frame without any storage of a signal.

If there is a flag, it may be a simple Boolean indication of whether there will be an interruption within a predetermined time period, for example an estimate of the time it will take to transmit a frame, which may then be cleared once that time period has passed. Alternatively, there may also be an indication of how long it will be until the interruption begins, and the compression engine [15] may then take this forecast into account when determining when to apply a higher level of compression to received frames, and for how long.

Finally, the wireless transmitter [16] may send different signals [19] depending on whether the interruption [23] will result in a total loss of signal across the connection [110] or merely a severe reduction in bandwidth during the period of the interruption [23]. An example of behaviour in the former case is shown in FIG. 4a and an example of behaviour in the latter case is shown in FIG. 4b.

In either case, at Step S32 (of FIG. 3) the compression engine [15] determines whether an interruption is due. This may be by checking a flag as aforementioned, or according to the receipt of a signal [19] from the radio transmitter [16] or lack of one. The normal case is that an interruption [23] is not required, and in this case the process follows the branch beginning at "No" to Step S3N3. At this step, the compression engine [15] compresses the received frame to a first compression level. This is the standard compression level used by the system, and may in fact mean that the frame is not compressed at all but is transmitted unchanged. This is the compression level used for frames [21A, B, C, E] as indicated by the fact that they are all the same height in the Figure.

At time point [41] in FIGS. 4a and 4b the wireless transmitter [16] indicates to the compression engine [15] as aforementioned that an interruption is due.

In the example shown in FIG. 4a the signal [19] from the wireless transmitter [16] indicates that no data transmission will be possible. As a result, at Step S32 the compression engine [15] determines that an interruption is due and the process follows the branch beginning at "Yes" to Step S3Y3. At this step, the compression engine [15] compresses the received frame to a second compression level. In the example shown in FIG. 4a this compression level must be very high, as indicated by the fact that frame [21D] is much smaller than the other frames [21A, B, C, E]. This indicates that it is compressed to a much higher degree. This may mean compressing the data at all where this would not normally occur, or it may mean applying a compression algorithm that will reduce the volume of the data to a greater degree than the standard compression, perhaps at the risk of losing detail and quality in the final image.

Because of the very high level of compression used on the frame [21D] it can be transmitted in a very short period of time, preferably resulting in the whole frame [21D] being transmitted before the interruption occurs. This is also indicated by the small size of the frame [21D] in FIG. 4a.

In the example shown in FIG. 4b the signal [19] from the wireless transmitter [16] indicates that some data transmission will be possible. However, this still operates as an indication that an interruption [23] is due and accordingly after Step S32 the process follows the branch beginning at "Yes" to Step S3Y3 and the compression engine [15] compresses the received frame [21D] to a second compression level. In the example shown in FIG. 4b the second compression level does not need to be as high as in the example shown in FIG. 4a as some data transmission will still be possible during the interruption [23] and as a result more time is available for transmission. However, the second compression level will still be higher than the first transmission level in order to increase the chance of transmitting the whole frame [21D] before it is required for display despite the interruption [23]. Accordingly, in the Figure, the frame is represented by a box [21D] with less height than the boxes [21A, B, C, E] used to represent the other frames to indicate that it is compressed to a higher level, but it is the same length to indicate that due to the higher compression it takes the same length of time to transmit it despite the fact that less bandwidth is available during the interruption [23].

FIG. 5 shows an example in which interruptions [51, 23] are periodic and therefore can be predicted using a historical analysis of the connection [110/22]. This may be performed by the compression engine [15], which can then use the resulting knowledge of the normal periodicity of the interruptions [51, 23] to determine the time interval before the next interruption will occur.

At Step S32, the compression engine [15] determines the time that has passed since the last interruption [51] using, for example, an internal timer that is reset to zero every time an interruption occurs. It then determines whether it should expect another interruption soon by comparing the value of the timer to the period of the interruptions as determined by analysis of the historical behaviour of the connection [110/22]. For example, if previous interruptions have occurred every 5 ms and the value of the timer is only 2 ms, the compression engine [15] determines that no interruption is due and the process follows the branch beginning at "No" to Step S3N3 at which the compression engine [15] applies a first level of compression to the frame [21A, C, E].

If the value of the timer is 5 ms or within a predetermined threshold of proximity to 5 ms—for example the period of interruptions is determined to be 5 ms, the compression engine [15] applies a threshold of 4.5 ms to allow some additional time, and at Step S32 the timer has a value of 4.7 ms—the compression engine [15] determines that it should expect another interruption [23] soon. The process then follows the branch beginning at "Yes" to Step S3Y3 and the compression engine [15] applies a second level of compression to the frame [21D] as previously described.

Figure 6A:
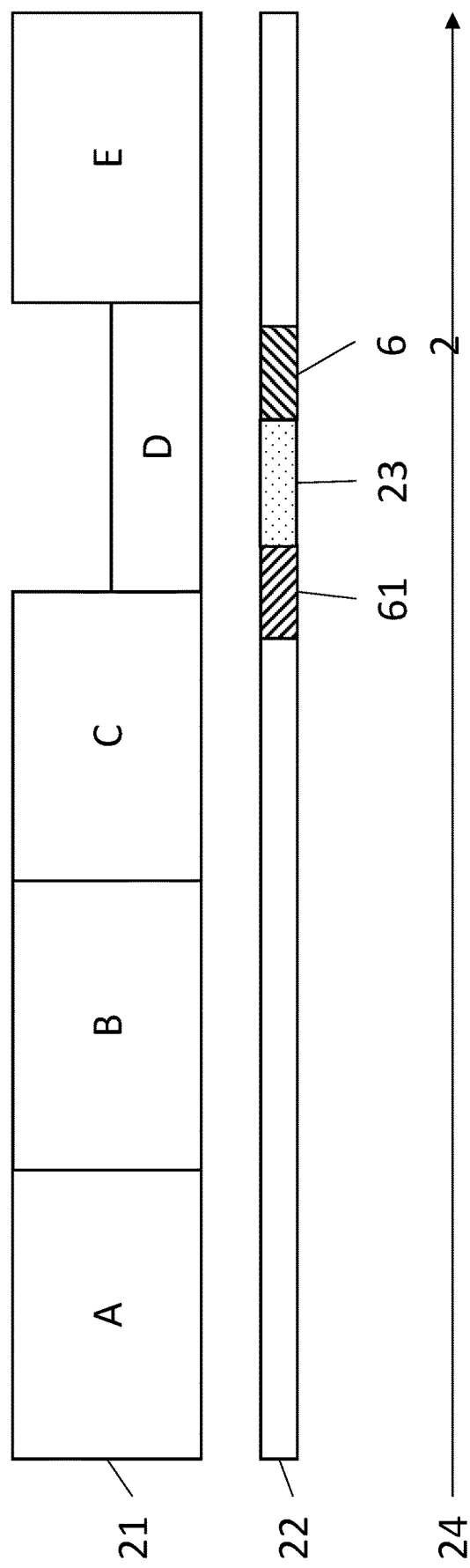
FIGS. 6a and 6b shows an interruption being detected as it commences in another embodiment of the invention.
Figure 6B:
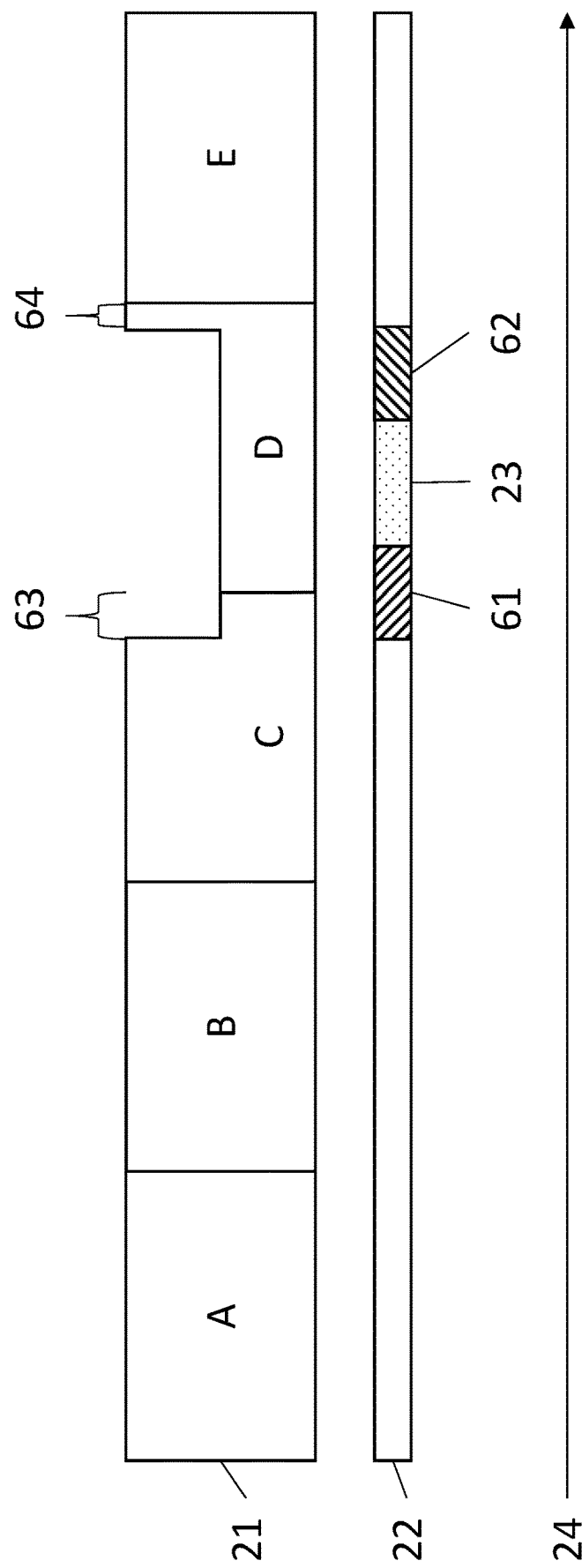

FIGS. 6a and 6b show examples involving a non-periodic interruption [23] in the signal [22]. This example may also involve a signal [19] from the wireless transmitter [16] to the compression engine [15] if analysis of the bandwidth of the connection [110] is carried out by the radio transmitter [16] and a suitable signalling connection [19] is available. Alternatively, analysis of the bandwidth of the connection [110] may be carried out by the compression engine [15], in which case the methods used in these examples may serve as a method for the compression engine [15] to determine that a non-periodic interruption [23] is due without any signalling from the wireless transmitter [16].

As in the previous Figures, the signal [22] is indicated by a strip at the bottom of FIGS. 6a and 6b, but in these examples the interruption [23] is preceded [61] and succeeded [62] by periods of low bandwidth in which the level of the available bandwidth is falling and rising respectively. The reduction in bandwidth [61] can be detected by the wireless transmitter [16] due to its intrinsic knowledge of the bandwidth available for transmission or by the compression engine [15] as after a period of low bandwidth compressed data that is ready for transmission but could not be transmitted due to lack of bandwidth will "back up" as the flow buffers between or in the compression engine [15] and/or the wireless transmitter [16] fill. This lack of space in the buffers can serve as an indication to the compression engine [15] that the level of available bandwidth has fallen.

In either case, the compression engine [15] may use the fall in bandwidth as an indication that an interruption is due. For example, analysis of the history of the connection [110] may indicate that when the bandwidth falls at a particular rate or below a particular threshold, such behaviour is always followed by an interruption [23]. Accordingly, this knowledge may be used to set a flag indicating that an interruption [23] is due or it may be used as a signal in itself as previously described.

At Step S32 the compression engine [15] determines whether the bandwidth has fallen in a manner indicating that an interruption [23] is due, according to predetermined metrics as previously described. If the bandwidth is at a normal level or within an acceptable boundary, the compression engine [15] determines that an interruption [23] is not due and the process follows the branch beginning at "No" to Step S3N3: the compression engine [15] applies a first level of compression to the received frame [21A, B, C, E].

If the compression engine [15] determines at Step S32 that the bandwidth has fallen in a manner that indicates that an interruption [23] is due, the process follows the branch beginning at "Yes" to Step S3Y3 and the compression engine [15] applies a second level of compression. In the example shown in FIG. 6a, as in those shown in FIGS. 4a, 4b, and 5, the second level of compression is applied from the beginning of the next frame [21D] after the compression engine [15] determined that an interruption [23] was due. This results in the frame [21D] having a smaller volume and therefore increasing the likelihood that it can be transmitted before it is required for display, despite the interruption [23].

In the examples shown in FIGS. 4 and 5, where the expected length of the interruption [23] is more likely to be known due to signals [19] from the wireless transmitter [16] or analysis of previous interruptions [51], the compression engine [15] could return to the first level of compression as soon as the interruption [23] was known to be over or at another known point after the interruption [23], for example at the beginning of transmission of a subsequent frame [21E] after the interruption [23] as is shown in FIGS. 4, 5, and 6a, since either the frame that was interrupted [21D] was transmitted successfully or it is too late and the deadline for its display has already passed.

In the examples shown in FIGS. 6a and 6b, however, the length of the interruption [23] is not predictable due to the fact that it is not periodic and signals [19] from the wireless transmitter [16] may not actually indicate the interruption [23] as opposed to being, for example, regular updates on the current bandwidth. The compression engine [15] therefore determines that the interruption [23] has ended by the increase [62] in available bandwidth as the connection [110] returns to its normal state. It may determine this either from an update on the available bandwidth from the wireless transmitter [16] or by monitoring the level of its output buffers to determine when they begin to empty at an acceptable rate. It may then return to the first level of compression as soon as the bandwidth has returned to an acceptable level, indicating that the interruption [23] is over, or at the beginning of the subsequent frame [21E] according to the same behaviour as the compression engine [15] in the examples shown in FIGS. 4 and 5.

In the example shown in FIG. 6b, at Step S32 the compression engine [15] determines whether the bandwidth has fallen in a manner that indicates that an interruption [23] is due and according to this determination it applies one of the two levels of compression at Steps S3Y3 or S3N3 as previously described. However, in this example the second level of compression is not applied at the beginning of the next frame [21D] after the compression engine [15] determined that an interruption was due, but is instead applied immediately to the remains of the frame [21C] that was in the process of transmission. This is indicated in the Figure by a sudden reduction [63] in the vertical height of the box [21C] indicating the frame before the interruption [23], beginning at the point at which the reduction in bandwidth [61] preceding the interruption [23] begins.

Similarly, at the end of the interruption [23], which is again indicated by a period of low but increasing bandwidth [62], the compression engine [15] determines that the interruption [23] is over and immediately returns to the first level of compression, indicated by a sudden increase [64] in the vertical height of the box representing the frame [21D], beginning at the end of the second period of low bandwidth [62].

These examples of the compression level changing during transmission of a frame [21] need not be used together; the compression engine [15] may begin applying the second level of compression in the middle of the frame [21C] before the frame [21D] that would be interrupted but not return to the first level of compression until the beginning of the frame [21E] after the interruption [23] is over, or it may begin applying the second level of compression at the beginning of the frame [21D] that will be interrupted and return to the first level of compression as soon as the interruption [23] is over. Furthermore, such methods are not limited to the case of an interruption [23] detected due to a reduction in bandwidth [61]; they may be used in any other case. For example, in the examples shown in FIG. 4 the compression engine [15] could begin applying the second level of compression immediately upon receiving a signal [19/41] from the wireless transmitter [16] that an interruption [23] is due, and in the example shown in FIG. 5 the compression engine [15] could return to the first level of compression as soon as analysis of the history of the connection [110] indicates that the interruption [23] should be over.

Similarly, the example described in FIG. 4a where there is a complete interruption and no data transmission is possible is not limited to the case where an interruption [23] is signalled [19/41] by the wireless transmitter [16]. The nature of the interruption [23] could also be determined by analysis of the behaviour of the connection [110] as described in FIGS. 5 and 6, and the second level of compression defined to be a higher level as appropriate.

The definition of the second level of compression may also be affected by the time available between the determination that an interruption is due or the beginning of the application of the second level of compression if these are different and the beginning of the interruption [23]. If the wireless transmitter [16] or determination of a pattern of interruptions [51, 23] have given the compression engine [15] an indication of the time before the interruption [23] will take place, this may be taken into account in the compression level applied: i.e. the second compression level may be selected from among a number of possible compression levels such that more rigorous compression is applied where a short time is available before the interruption [23] will take place than if a longer time is available.

In all cases, at Step S44 the compression engine [15] passes the frame to the wireless transmitter [16] for transmission to the display control device [12], where it will be decompressed as appropriate in the decompression engine [18] and transmitted to the display device [13] for display. It may also attach an indication, such as a flag in a packet header, of which compression level was used, in order to reduce the chance of data corruption in the decompression engine [18] caused by the use of an inappropriate decompression algorithm.

These methods are an improvement over the current art because in the examples shown in FIGS. 4-6 none of the frames [21] are dropped. The frame [21D] that was dropped in the example in FIG. 2 is instead compressed to a greater degree than the other frames [21A, B, C, E]. This means that it requires less time for transmission and can be transmitted before the interruption [23] occurs (in the case of a complete interruption) or despite a large reduction in bandwidth caused by an interruption [23]. It will therefore be displayed on the display device [13] as normal, without visible interruption to the movement of the image, even if the quality of the individual frame [21D] is reduced.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the components may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method of compensating for potential interruptions in a wireless connection over which data is transmitted from a host device having a transmitting component to a client device, wherein the data is normally compressed at a first compression level, the method comprising:
    determining an expected occurrence of an interruption to the wireless connection over which the data is being transmitted to the client device based on the client device entering a power-reduced mode of operation, the host device moving from a first position to a second position, and a spectral analysis of previous interruptions to the wireless connection caused by changes in beamforming direction, the spectral analysis indicating a rate at which the previous interruptions occur;
    setting a second compression level for compressing the data when the interruption is expected to occur, the second compression level being set at a higher level than the first compression level normally used for the data;
    compressing the data at the second compression level; and
    forwarding the data compressed at the second compression level to the transmitting component for transmittal to the client device.

2. The method of claim 1, wherein determining the expected occurrence of the interruption includes determining an expected duration of the interruption and wherein the data is compressed at the second compression level at least until the expected duration of the interruption has ended.

3. The method of claim 2, wherein the expected duration of the interruption is calculated based on the rate at which the previous interruptions occur.

4. The method of claim 1, wherein determining the expected occurrence of the interruption includes determining that a buffer used for storing the data prior to transmittal is full and that the interruption has commenced.

5. The method of claim 4, wherein an end of the interruption is determined when it is determined that the buffer is able to accept data at a rate higher than a predetermined threshold rate.

6. The method of claim 1, wherein the expected occurrence of the interruption is determined by receipt of information from the transmitting component that the interruption is due.

7. The method of claim 2, wherein the expected duration of the interruption is determined by receipt of information from the transmitting component of the expected duration of the interruption.

8. The method of claim 1, wherein the expected occurrence of the interruption is determined by receipt of information from the transmitting component that the interruption has commenced.

9. The method of claim 2, wherein the expected duration of the interruption is determined by receipt of information from the transmitting component that the interruption has ended.

10. The method of claim 1, wherein the data comprises display data.

11. The method of claim 10, wherein the display data is compressed at the second compression level at least until an end of a frame of the display data that is being compressed at the second compression level.

12. The method of claim 1, further comprising:
performing one or more maintenance operations that may cause the interruption; and
setting the first compression level for compressing the data when the one or more maintenance operations are completed.

13. The method of claim 12, wherein the one or more maintenance operations comprises any one or more of:
beamforming;
transmission/reception channel changing;
entering the power-reduced mode of operation; and
entering a sleep mode of operation.

14. A system for compensating for potential interruptions in a wireless connection over which data is transmitted from a host device having a transmitting component to a client device, wherein the data is normally compressed at a first compression level, the system comprising:
at least one processor; and
at least one memory storing instructions that, when executed by the at least one processor, cause the system to:
determine an expected occurrence of an interruption to the wireless connection over which the data is being transmitted to the client device based on the client device entering a power-reduced mode of operation, the host device moving from a first position to a second position, and a spectral analysis of previous interruptions to the wireless connection caused by changes in beamforming direction, the spectral analysis indicating a rate at which the previous interruptions occur;
set a second compression level for compressing the data when the interruption is expected to occur, the second compression level being set at a higher level than the first compression level normally used for the data;
compress the data at the second compression level; and
forward the data compressed at the second compression level to the transmitting component for transmittal to the client device.

15. A non-transitory computer readable medium including instructions which, when executed in a processing system, cause the processing system to perform a method for compensating for potential interruptions in a wireless connection over which data is transmitted from a host device having a transmitting component to a client device, wherein the data is normally compressed at a first compression level, the method comprising:
determining an expected occurrence of an interruption to the wireless connection over which the data is being transmitted to the client device based on the client device entering a power-reduced mode of operation, the host device moving from a first position to a second position, and a spectral analysis of previous interruptions to the wireless connection caused by changes in beamforming direction, the spectral analysis indicating a rate at which the previous interruptions occur;
setting a second compression level for compressing the data when the interruption is expected to occur, the second compression level being set at a higher level than the first compression level normally used for the data;
compressing the data at the second compression level; and
forwarding the data compressed at the second compression level to the transmitting component for transmittal to the client device.

16. The system of claim 14, wherein execution of the instructions further causes the system to:
perform one or more maintenance operations that may cause the interruption; and
set the first compression level for compressing the data when the one or more maintenance operations are completed.

17. The system of claim 16, wherein the one or more maintenance operations comprises any one or more of:
beamforming;
transmission/reception channel changing;
entering the power-reduced mode of operation; and
entering a sleep mode of operation.

18. The non-transitory computer readable medium of claim 15, wherein execution of the instructions further causes the processing system to:
perform one or more maintenance operations that may cause the interruption; and
set the first compression level for compressing the data when the one or more maintenance operations are completed.

19. The non-transitory computer readable medium of claim 18, wherein the one or more maintenance operations comprises any one or more of:
beamforming;
transmission/reception channel changing;
entering the power-reduced mode of operation; and
entering a sleep mode of operation.

* * * * *